Oct. 16, 1962 E. T. LEWIS 3,058,281
POWER LAWN MOWER
Filed Dec. 19, 1960 3 Sheets-Sheet 1

INVENTOR.
EVAN T. LEWIS
BY
Morgan, Finnegan, Durham & Pine
ATTORNEYS

Oct. 16, 1962     E. T. LEWIS     3,058,281

POWER LAWN MOWER

Filed Dec. 19, 1960     3 Sheets-Sheet 2

INVENTOR.
EVAN T. LEWIS

BY
Morgan, Finnegan, Durham & Pine
ATTORNEYS

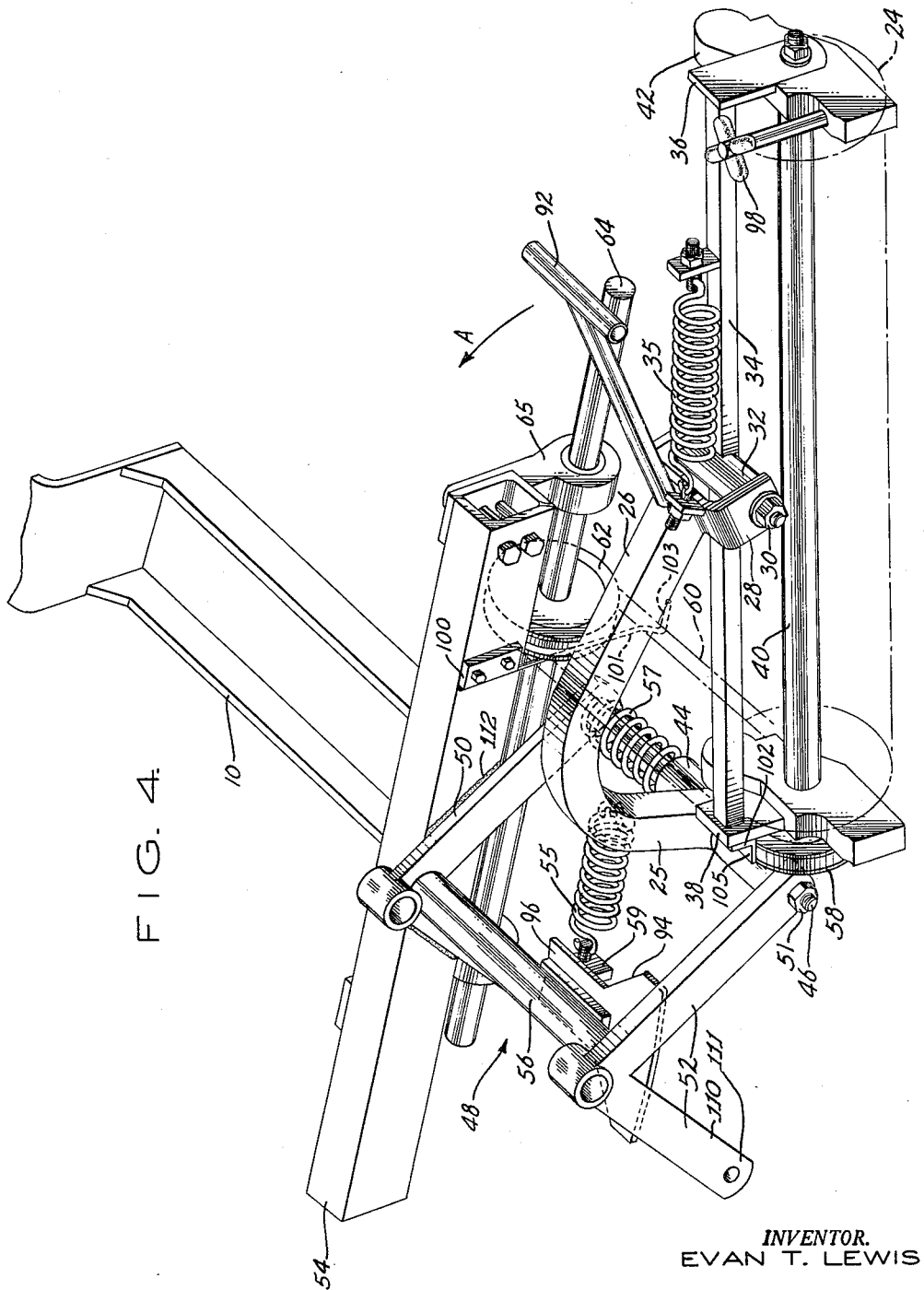

United States Patent Office 3,058,281
Patented Oct. 16, 1962

3,058,281
POWER LAWN MOWER
Evan T. Lewis, Racine, Wis., assignor to Jacobsen Manufacturing Company, Racine, Wis., a corporation of Wisconsin
Filed Dec. 19, 1960, Ser. No. 76,850
4 Claims. (Cl. 56—7)

The present invention relates to power lawn mowers having front and side cutting units and, more particularly, to an improved mounting and driving mechanism for the side units.

Power mowers of the type used for cutting grass on golf courses, highways and other large expanses generally utilize a front cutting unit and transversely extending side cutting units. These cutting units must be able to follow and conform to various terrain undulations. This problem is especially acute with the side units which project outwardly a substantial distance from the main mower body. The variation in height at the extremities of the side units during mowing can be quite large. Because such power mowers are used under a variety of operating conditions, including adverse jolting ground as well as smooth fairways, it is therefore necessary to provide mounting means for these side units which not only can readily accommodate the side units to terrain undulations but which also are sturdy and rugged.

This problem in mounting and supporting the side cutting units is further intensified by the necessity of arranging for proper power or driving connections between the mower engine and the side cutting units. The driving connection must be certain and foolproof when it is desired to run the side cutting units regardless of their angular position; yet, there must be a foolproof means of disengaging the side cutting units when it is desired to cut with the front unit only. During mowing, the operator frequently must mow a narrow swath and in such instances the side cutting units are raised off the ground. If the side units continue to rotate while raised out of cutting position, excessive friction develops between the bed knife and the reel blades since there are no grass clippings to lubricate the blades. This friction eventually results in binding and damage to the cutting edge of the blades.

In order to overcome such problems, it is a frequent practice in the art to devise mounting arrangements for the side cutting units consisting of heavy and rugged links which are doubly pivoted, the link being pivotally attached to the side unit and also pivotally attached to the frame for flexibility, with driving pulleys or gears concentrically placed on the pivot points. This arrangement is heavy, rugged and flexible but requires large weight and is expensive to manufacture.

It was a frequent practice in the prior art to disengage the side units from their drive means by providing a clutch connected to the side units only and a clutch connected to the front cutting unit only. This is an expedient that adds more expense. Moreover, it complicates the drive mechanism of the mower and adds to the weight of the entire device. Another present practice requires the operator to manually remove the drive pulley belts from the side reel drive pulley. After he completes the mowing of the narrow swath, he must manually reengage the pulley belts. This obviously is a time-consuming and a morale-lowering expedient.

The above difficulties are obviated by the present invention. Briefly, the invention provides a simple, efficient gang mower having improved mounting and driving mechanisms for the side cutting units. The power connections are automatically disengaged when the side cutting units are raised from the ground, without the use of expensive clutches or any manual effort. The arrangement is sturdy and rugged but preserves excellent free floating action or terrain undulation following ability.

Speaking generally, the invention includes the provision of means for mounting the side of the cutting units to the main mower frame including an arcuate arm pivotally connected to the top of each mower unit adjacent the middle thereof and provided with counterbalancing tension springs to effect balanced weight distribution along the length of the cutting unit for free-floating mowing action. The arcuate arms are each freely supported at their other end on a shaft carried between the depending extremities of a yoke member fixed to the main mower frame. The arcuate arm supports this associated side mower.

The side reel units are provided with a drive pulley at the end of the reel axle which is driven by pulley belts from sheaves secured to the main mower drive shaft. The arcuate mower carry arm is biased by a belt tension spring mounted on the shaft carried by the yoke for movement away from the main mower drive shaft, thereby maintaining tension on the side mower pulley belt. A cam plate is fixed to the yoke remote from the shaft and in the path of travel followed by the arcuate arm when the side unit is pivotally raised on the shaft toward transport position away from the ground to cam against and move the arcuate arm with its associated cutting unit forwardly against the action of the belt tension spring. This forward movement of the cutting unit effectively loosens the pulley belt to disengage the raised side mower unit from its drive source. Guide means are positioned on the side mower drive pulley and associated sheave for maintaining the pulley belts in position above their associated pulleys and sheaves at all times. Thus the invention provides simple and effective means for disconnecting the drive of either side unit without affecting the drive connections to other driven members of the mower.

For a more complete understanding of the invention, reference should be had to the accompanying drawings, wherein:

FIG. 4 is an enlarged perspective view of the mower mounting means and the drive means of the subject invention.

Figure 1:
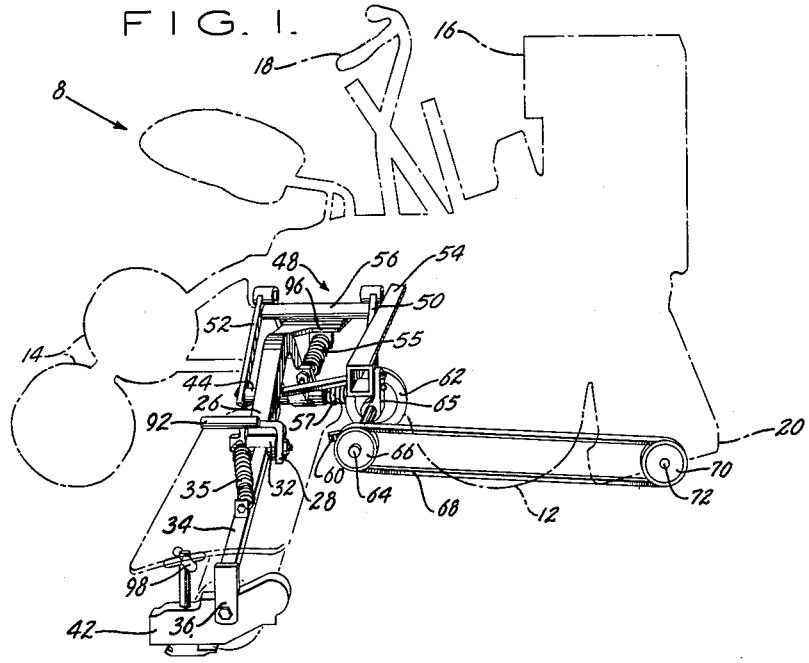
FIG. 1 is a perspective view illustrating a gang power mower, in phantom, provided with the preferred embodiment of side unit mounting and driving means of the present invention.

Referring to the drawings in detail, and particularly to FIGS 1 and 4, there is illustrated a gang mower of the conventional type embodying the invention. The mower designated generally at 8 comprises a main frame 10, to which is suitably secured a plurality of traction wheels 12, steering wheels 14 at the rearward portion of the frame, suitable power plant 16, and steering mechanism 18. Conventional devices of this kind suitable for use with the present invention are shown and illustrated in my Patent No. 2,909,882.

Mowers of this kind include a front reel cutting unit 20 positioned at the front end of frame 10, and two side reel cutting units 22 and 24 which extend laterally of the main frame 10. Front unit 20 may be supported from the main frame by any convenient means, including means disclosed in my previously referred-to Patent No. 2,909,882.

Since each of the side cutting units are mounted and driven in identical manner, a detailed description will be included for only one of the units, it being understood that the other side unit includes the same mounting and drive mechanisms operatively associated in the same manner.

Side unit 24 is supported by an arcuate carry arm 26 of generally square cross-section which extends transversely of the main frame 10 and includes at its outer end a bracket 28 provided with a stud shaft 30. Stud shaft 30, in turn, is loosely disposed in sleeve 32 which is fixed transversely to rod 34, the latter being carried at each end by brackets 36 and 38. Brackets 36 and 38 are freely mounted on the reel axle 40 while bracket 36 is also secured to outer reel support frame 42. This arrangement maintains brackets 36 and 38 disposed vertically upwardly relative to reel axle 40, as shown best in FIG. 4. Stud shaft 30 in sleeve 32 is located closely adjacent to but slightly inwardly of the midpoint of its associated cutting unit. A spring 35 attached at one end by the usual eye bolt to rod 34 and at its other end by the usual eye bolt to an anchor 37 on carry arm 26 above bracket 28 assists in effecting equalization of weight over the entire length of the side cutting unit.

Carry arm 26 is provided at its inner end, remote from bracket 28, with a transversely extending tubular section 44 in which a shaft 46 is loosely mounted. The shaft 46 is longer than tubular section 44, and its exposed ends are carried by a support element structure that is support for both the side cutting units. In the typical illustrative example shown in the drawings, the support structure is a yoke designated generally at 48. Yoke 48 consists of a pair of spaced angle elements 50 and 52 interconnected adjacent their apexes and rigidly fixed one to the other in spaced position by longitudinally extending tubular element 56. Front angle element 50 is secured by means, such as welding 112, to box frame member 54 of the main frame 10. The legs 110 of the angle elements 50 and 52 depend downwardly in parallel spaced relation, with each leg of the angle elements disposed equidistantly on each side of the longitudinal axis of the mower frame. The free ends 111 of angles 50 and 52 also are interconnected by the shafts 46, as mentioned above. The shafts 46 are secured at each of their threaded ends in the extremities of the downwardly depending ends of the angles 50 and 52 by nuts 51 associated with each arm 26.

A second spring 55, fixed at one end to anchor plate 59 below transverse tubular element 56 and at its other end to its associated carry arm 26, assists in resiliently supporting the weight of carry arm 26 and its associated side reel and mechanism. As shown in FIGURE 4, the spring 55 is connected to the arcuate carry arm 26 near the center portion of the arm displaced from both ends. Spring 55 tends to stabilize the inboard end of the side unit and cushion the pivotal movement of carry arm 26. Since arms 26 are pivotally secured to yoke 48 on the power frame 10 and since mower units 22 and 24 are, in turn, pivotally carried by arms 26, each side mower 22 and 24 is supported for freely-floating, independent disposition relative to the front unit 20 to follow various terrain undulations.

Figure 2:
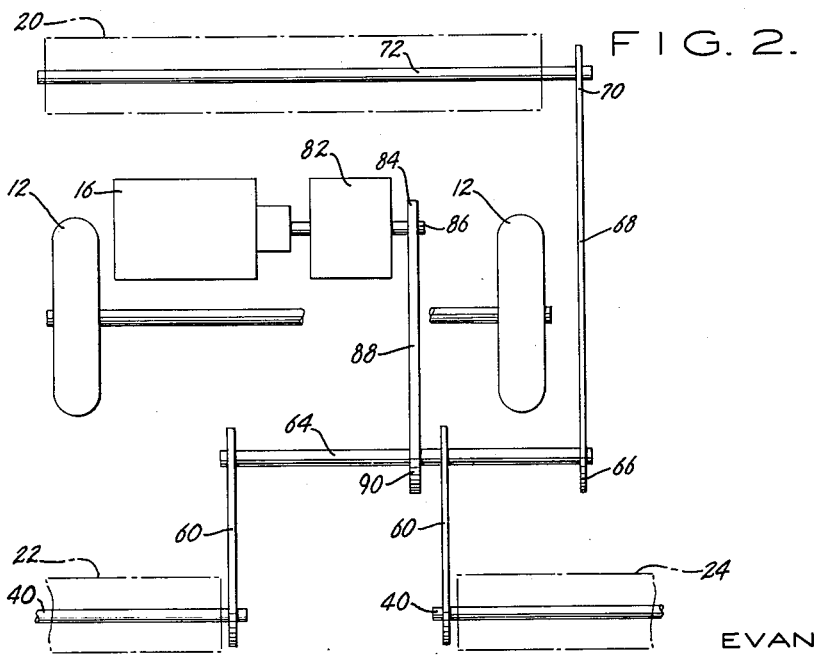
FIG. 2 is a schematic view of the transmission system of a gang mower embodying the present invention.
Figure 3:
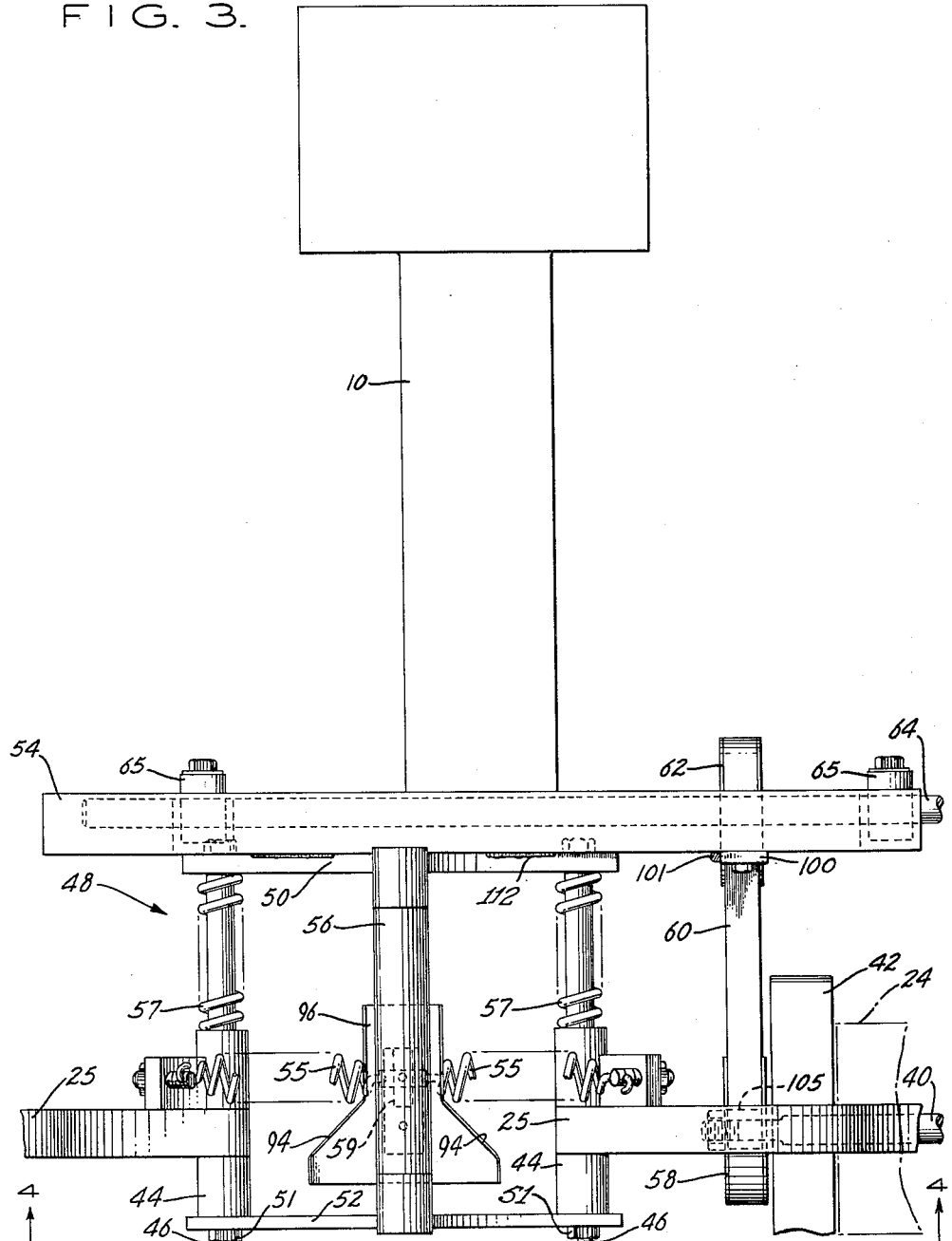
FIG. 3 is an enlarged plan view of the side unit mounting means as secured to the main mower frame.

To drive each side reel unit 22 and 24, the respective reel axle of each is provided at its inboard end with a pulley 58 on shaft 40, as shown best in FIG. 3. Each pulley 58 is driven by an associated pulley drive belt 60 that extends longitudinally of the main frame. The other end of pulley drive belt 60 is trained about a pulley 62 fixed to and rotating with main power drive shaft 64 suspended by brackets 65 from frame 54 (see FIG. 2).

As described above, arm 26 is loosely mounted on its associated shaft 46 carried by yoke 48. A compression spring 57 encircles shaft 46 with one end of spring 57 bearing against angle element 50 and the other end thereof bearing against the end of extension 44 of carry arm 26. Spring 57 thus resiliently urges arm 26 to its most rearward position, as shown in FIG. 4. In this position, belt 60 is tensioned and reel drive pulley 58 is in driving engagement therewith.

Turning now to the schematic transmission diagram shown in FIG. 2, main mower drive shaft 64 also includes a third pulley 66 which drives an associated pulley belt 68. The other end of pulley belt 68 is trained about a pulley 70 fixed to front reel axle 72 to drive the front cutting unit 20. Traction wheels 12 are driven independently from the main mower power source 16 through a clutching arrangement utilizing a system of variable pulleys and belts (not shown). Main mower drive shaft 64 is driven from a suitable power source such as engine 16 through a conventional clutch and transmission 82. A sprocket 84 is fixed to the output shaft 86 of the transmission 82. A suitable drive chain 88 is trained around sprocket 84 and transmits rotation to main mower drive shaft 64 through sprocket 90 fixed thereto.

As discussed hereinabove, when it is desired to raise the side mower units from their cutting position to a raised transport or storage position, it is necessary, in order to avoid damage to the reel blades, to disconnect the drive to these blades. To raise side mower units 22 or 24 to their transport or storage position, the operator grasps handle 92 fixed to arcuate arm 26 adjacent bracket 28 and pulls up thereon in the direction of arrow A, FIG. 4. This pivots arm 26 about its associated shaft 46, thereby raising its associated mower unit 22 or 24 from the ground.

As arm 26 is pivotally moved about shaft 46, the outer face 25 of arm 26 adjacent the curved portion of arm 26 engages inclined edge 94 of a camming means, e.g. a cam plate 96, which is fixed to the under surface of tubular element 56, as shown in FIG. 4, in the path of travel followed by arm 26. Spring anchor plate 59, in turn, is fixed to the underface of cam plate 96. As arm 26 continues to be raised in the direction of arrow A, edge 94 of cam plate 96 engages face 25 of carrier arm 26. This camming action slides arm 26 axially forwardly on shaft 46 against the action of belt tension spring 57. The forward movement of arm 26 causes the side cutting unit and its axle 40 to move forwardly, thereby moving its driven pulley 58 toward main mower output shaft 64 and loosening the tension in the associated pulley drive belt 60 to disconnect the driving connection between main mower drive shaft 64 and reel axle 40 since, as shown, the inclined cam edge 94 has a length or extent longitudinally of the main frame that is greater than the effective shortening in the length of the pulley belt 60 caused by the twisting thereof.

During downward return of side cutting unit 24 to ground position, face 25 of arm 26 moves away from cam edge 96 of cam plate 94 and compression spring 57 again urges carry arm 26 and its side cutting unit rearwardly to effect driving re-engagement between pulley 58 and belt 60 to rotate axle 40.

It will be understood that cam plate 96 has two complementary cam edges 94 for association within each arm 26 of the two side cutting units.

In conventional transport position and when operating the mower to cut grass with the front reel unit only, side reel units 22 and 24 are disposed angularly upwardly from the central portion of mower 8 in a partial vertical position away from the ground and are held in this position by hooking handles 92 into suitable latches provided on the main frame (not shown). In this position, face 25 of arm 26 is positioned at the end of cam edge 94 on cam plate 96 most adjacent shaft 56 with the pulley belt relaxed in disengaged position.

But in conventional storage position, after the mower has been completely de-actuated, side reel units 22 and 24 are usually disposed fully vertically upwardly of the central portion of mower 8. To move side cutting units 22 and 24 to storage position, the operator grasps handle 98 fixed to the outer reel support frame 42 and rotates the side unit 24 from angularly inclined transport position to vertically disposed storage position. The side cutting units are retained in this position by hooking handles 98 or handles 92 into suitable latches provided on the main frame (not shown) as will be understood. It will be understood that arm 26 remains stationary against cam plate 96 but the side unit pivots about shaft 30 carried by bracket 28.

In raising the cutting unit to storage position, driven pulley 58 moved outwardly and away from the main frame. It becomes disposed in a generally horizontal plane and is laterally displaced outwardly from its position shown in FIG. 3. However, driving pulley 60 remains vertical in its prior lateral position. The resultant twist and stretch of pulley belt 60 by this movement of pulley 58 pulls arm 26 further forwardly on cam plate 96 against the spring 57 to put more stress on the spring and to retension belt 60 on the pulleys. The tension on the belt and the stress on the spring effectively holds the associated mower unit firmly and securely.

To maintain pulley belt 60 in position about its associated pulley 58 and 62 during the movement of mower 24 to and from storage, transport and cutting positions, there are provided two belt guides 100 and 102. Belt guide 100 is secured to and downwardly depends from transverse box frame 54. Guide 100 includes an elongated element 101 disposed transversely of the stretches of belt 60 with a transverse section 103 under the lower stretch of belt 60, as shown in FIG. 4. Guide 100 thus prevents belt 60 from becoming disengaged from driving pulley 62.

Guide 102 is of generally L-shaped cross-section and is secured to bracket 38 of the cutting unit frame with the outstanding leg 105 thereof disposed against the top of pulley 58 (see FIG. 4). This prevents belt 60 from becoming displaced from pulley 58.

Thus the invention provides a simple, sturdy, rugged, efficient and economical gang mower with side reel units that are flexibly mounted for adaption to various terrain irregularities and which includes a simplified system of disengaging the side cutting units from their driving elements when the side units are raised out of cutting position.

What is claimed is:

1. In a power lawn mower having side cutting units carried by a main mower frame, the combination comprising a support element for said side units, means securing said support element to said main frame, a carry arm for each of said side units, means pivotally connecting one end of each of said carry arms to said support element, means pivotally connecting the other end of said carry arm to its associated side unit, each of said carry arms being pivotally connected to its associated side unit at a position closely adjacent to but displaced from the midpoint thereof toward said main frame, a spring member for each carry arm, means mounting one end of said spring member to said other end of the carry arm, and means mounting the other end of said spring member to its associated side unit at a position thereon displaced from the midpoint thereof away from said main mower frame, whereby each side unit has free rocking movement and vertical movement and the weight of each cutting unit and its associated mechanism is distributed substantially evenly over its length.

2. The invention as defined in claim 3 wherein each cutting unit is of the reel type, each cutting unit having a cutting reel, and including a drive axle for rotating said reel, said drive pulley being fixed to the end of the axle adjacent said main frame, and the means for driving the pulley belt from the power source including a drive pulley for driving the pulley belt said drive pulley being positioned in the same plane as the plane occupied by the driven pulley when said cutting unit is in cutting position so that the driven pulley twists the belt to effect a shortening of the length of the belt when the cutting unit and associated carry arm is pivotally moved on said shaft to transport position, said cam face being operative to move said carry arm and its associated driven pulley longitudinally toward the drive pulley through a distance greater than the effective shortening of the length of the pulley belt when said side cutting unit is moved toward transport position to disengage the driven pulley from the drive pulley.

3. A gang power lawn mower having a power source and side cutting units carried by a main mower frame comprising a yoke for supporting said units, means securing said yoke to said main frame, an arcuate carry arm for each side unit, an elongated shaft carried in each end of said yoke, means mounting a side unit carry arm on each shaft to extend transversely of the main frame and for pivotal movement of said carry arm on the shaft and for movement of said arm longitudinally of the main frame, means pivotally connecting the free end of each carry arm to its associated side unit at a position thereon closely adjacent to the center of gravity of the cutting unit but displaced therefrom toward the main frame, for pivotal movement of the cutting unit into and out of cutting position toward and away from transport position, a driven pulley attached to the end of each side cutting unit adjacent said main frame to actuate the unit for cutting, a pulley belt extending longitudinally of the main frame for rotating said driven pulley, means for driving said pulley belt from the power source, resilient means on said shaft for normally urging its associated driven pulley longitudinally of the main frame into driving engagement with said pulley belt when said associated side unit is disposed in cutting position, and means on said main frame for disengaging said driven pulley and said pulley belt upon movement of said associated side unit from cutting position toward transport position, the means including a cam plate having an inclined cam face disposed in the path of travel of said carry arm as said carry arm pivots on its associated shaft during the movement of said side cutting unit from cutting position toward transport position, said cam face having an extent longitudinally of the main frame to engage and move said carry arm longitudinally of the main frame along its associated shaft against the action of said resilient means and through a distance longitudinally of the main frame greater than the effective shortening of the pulley belt due to twisting thereof, to effect disengagement of said driven pulley from its associated drive belt when said cutting unit is in transport position.

4. The subject matter of claim 1 characterized by the fact that each carry arm is arcuate and the combination includes an anchor member fixed to the main frame and a second spring member for each carry arm, the second spring member being connected to the anchor member and to a carry arm at a position on the carry arm near the center portion of the arm displaced from the ends of the arm to assist in resiliently supporting the weight of the carry arm and its associated cutting unit.

References Cited in the file of this patent

UNITED STATES PATENTS

| 2,104,719 | Pol et al. | Jan. 4, 1938 |
| 2,168,706 | George et al. | Aug. 8, 1939 |
| 2,299,859 | Speiser | Oct. 27, 1942 |
| 2,475,671 | McCartney | July 12, 1949 |
| 2,909,882 | Lewis | Oct. 27, 1959 |
| 2,954,658 | Bruce | Oct. 4, 1960 |